US008496899B2

(12) United States Patent
Imai

(10) Patent No.: US 8,496,899 B2
(45) Date of Patent: Jul. 30, 2013

(54) EXHAUST GAS PURIFYING CATALYST

(75) Inventor: Hiroto Imai, Shizuoka (JP)

(73) Assignee: Cataler Corporation, Shizuoka (JP)

( * ) Notice: Subject to any disclaimer, the term of this patent is extended or adjusted under 35 U.S.C. 154(b) by 0 days.

(21) Appl. No.: 12/524,352

(22) PCT Filed: Jan. 25, 2008

(86) PCT No.: PCT/JP2008/051124

§ 371 (c)(1), (2), (4) Date: Jul. 23, 2009

(87) PCT Pub. No.: WO2008/090991

PCT Pub. Date: Jul. 31, 2008

(65) Prior Publication Data

US 2010/0056367 A1 Mar. 4, 2010

(30) Foreign Application Priority Data

Jan. 26, 2007 (JP) ................................ 2007-016598

(51) Int. Cl.

| | |
|---|---|
| ***B01D 53/56*** | (2006.01) |
| ***B01D 53/86*** | (2006.01) |
| ***B01J 8/00*** | (2006.01) |
| ***B01J 23/00*** | (2006.01) |
| ***B01J 21/00*** | (2006.01) |
| ***B01J 20/00*** | (2006.01) |
| ***C01B 21/00*** | (2006.01) |

(52) U.S. Cl.

USPC ........ 423/239.1; 502/252; 502/261; 502/262; 502/304; 502/326; 502/327; 502/328; 502/330; 502/332; 502/333; 502/334; 502/339; 502/340; 502/341; 502/349; 502/355; 502/415; 502/439; 502/527.12; 502/527.13; 502/527.19

(58) Field of Classification Search

USPC ................ 502/252, 261, 262, 304, 326, 327, 502/328, 330, 332–334, 339–341, 349, 355, 502/415, 439, 527.12, 527.13, 527.19; 423/239.1

See application file for complete search history.

(56) References Cited

U.S. PATENT DOCUMENTS 4,128,506 A * 12/1978 Hegedus et al. .............. 502/334
4,152,301 A * 5/1979 Summers et al. ............ 502/333

(Continued)

FOREIGN PATENT DOCUMENTS

DE 19742705 A1 4/1998
JP 10-192707 A 7/1998

(Continued)

OTHER PUBLICATIONS

"Extended European Search Report for European Patent Application No. 08703936.8", Aug. 18, 2011.

(Continued)

*Primary Examiner* — Cam N. Nguyen

(74) *Attorney, Agent, or Firm* — Hultquist, PLLC; Mary B. Grant; Steven J. Hultquist

(57) ABSTRACT

An exhaust gas purifying catalyst 1 has a catalyst substrate 3 and catalyst coating layers 5, 7 that are formed on the catalyst substrate 3 and contain (a) Rh, (b) Pt, (c) an alkali metal or alkaline earth element, and (d) an inorganic oxide. The catalyst coating layers 5, 7 has a layered structure including an inside layer 5 where the component (a) is substantially locally existing, and an outside layer 7 where the component (b) is substantially locally existing. The inside layer 5 also contains a zirconia oxide.

21 Claims, 1 Drawing Sheet

U.S. PATENT DOCUMENTS 5,212,142 A 5/1993 Dettling
5,332,554 A * 7/1994 Yasaki et al. .................. 422/180
5,407,880 A * 4/1995 Ikeda et al. ..................... 502/67
5,525,307 A * 6/1996 Yasaki et al. .................. 422/171
5,593,647 A * 1/1997 Kirby ........................... 422/180
5,597,771 A * 1/1997 Hu et al. ....................... 502/304
5,814,576 A * 9/1998 Yamamoto .................... 502/303
5,948,377 A * 9/1999 Sung ......................... 423/213.5
6,066,587 A 5/2000 Kurokawa et al.
6,087,298 A * 7/2000 Sung et al. .................... 502/333
6,150,288 A * 11/2000 Suzuki et al. ................. 501/105
6,165,429 A 12/2000 Ikeda et al.
6,261,989 B1 * 7/2001 Tanaka et al. ................. 502/328
6,294,140 B1 * 9/2001 Mussmann et al. ........ 423/213.5
6,306,794 B1 * 10/2001 Suzuki et al. ................. 502/304
6,348,430 B1 * 2/2002 Lindner et al. ................ 502/304
6,375,910 B1 * 4/2002 Deeba et al. ............... 423/239.1
6,413,483 B1 * 7/2002 Brisley et al. .............. 423/239.1
6,413,904 B1 * 7/2002 Strehlau et al. ............... 502/327
6,432,859 B1 * 8/2002 Iwakuni et al. ............... 502/339
6,444,610 B1 * 9/2002 Yamamoto .................... 502/325
6,497,851 B1 * 12/2002 Hu et al. .................... 423/213.5
6,503,862 B1 * 1/2003 Yamamoto ...................... 502/65
6,514,905 B1 * 2/2003 Hanaki et al. ................. 502/328
6,589,901 B2 * 7/2003 Yamamoto et al. ............. 502/65
6,764,665 B2 * 7/2004 Deeba et al. ............... 423/239.1
6,770,590 B2 8/2004 Watanabe
6,777,370 B2 * 8/2004 Chen ............................ 502/241
6,881,384 B1 * 4/2005 Uenishi et al. ................ 422/177
6,967,186 B2 * 11/2005 Takaya et al. ................. 502/325
7,022,646 B2 * 4/2006 Li ................................ 502/339
7,081,430 B2 * 7/2006 Uenishi et al. ................ 502/327
7,214,331 B2 * 5/2007 Jiang et al. .................... 252/373
7,276,212 B2 * 10/2007 Hu et al. ....................... 422/177
7,329,629 B2 * 2/2008 Gandhi et al. ................ 502/325
7,374,729 B2 * 5/2008 Chen et al. .................... 422/177
7,407,911 B2 * 8/2008 Yeo .............................. 502/304
7,517,510 B2 * 4/2009 Chen et al. ................. 423/213.2
7,524,465 B2 * 4/2009 Kumar et al. ................. 422/180
7,550,124 B2 * 6/2009 Chen et al. ................. 423/213.2
7,576,031 B2 * 8/2009 Beutel et al. .................. 502/339
7,638,460 B2 * 12/2009 Nakamura et al. ............ 502/326
7,709,414 B2 * 5/2010 Fujdala et al. ................ 502/326
7,749,472 B2 * 7/2010 Chen et al. ................. 423/213.2
7,758,834 B2 * 7/2010 Chen et al. ................. 423/213.2
7,795,172 B2 * 9/2010 Foong et al. .................. 502/327
7,875,250 B2 * 1/2011 Nunan .......................... 422/177
2004/0087439 A1 5/2004 Hwang et al.
2004/0198595 A1 * 10/2004 Chen ............................ 502/328
2005/0164879 A1 * 7/2005 Chen ............................ 502/328
2007/0099796 A1 * 5/2007 Nakamura et al. ............ 502/304
2008/0044330 A1 * 2/2008 Chen et al. ................. 423/213.5

FOREIGN PATENT DOCUMENTS

JP 2000-157867 A 6/2000
JP 2000-246107 A 9/2000
JP 2000-342966 A 12/2000
JP 2002-361094 A 12/2002
JP 2004-267850 A 9/2004
WO 2005021138 A2 3/2005
WO 2005099870 A2 10/2005

OTHER PUBLICATIONS

Notice of Reasons for Rejection issued on Jun. 26, 2012 in Japanese Patent Application No. 2008-555119.

* cited by examiner

EXHAUST GAS PURIFYING CATALYST

CROSS-REFERENCE TO RELATED APPLICATIONS

This application is a U.S. national phase under the provisions of 35 U.S.C. §371 of International Application No. PCT/JP08/51124 filed Jan. 25, 2008, which in turn claims priority of Japanese Patent Application No. 2007-016598 filed Jan. 26, 2007. The disclosures of such international application and Japanese priority application are hereby incorporated by reference herein in their respective entireties, for all purposes.

TECHNICAL FIELD

The present invention relates to an exhaust gas purifying catalyst that removes toxic substances contained in exhaust gas from an internal combustion engine of an automobile, a motorcycle and others.

BACKGROUND ART

In recent years, carbon dioxide emitted from an internal combustion engine of an automobile and others has been a problem from the standpoint of protection of the global environment. A lean burn engine using less fuel provides a promising solution to this problem.

A catalyst including a NOx storage material, such as alkali metal and others, as well as a noble metal is used as a catalyst for purifying NOx contained in exhaust gas (see Patent Literature 1). This catalyst absorbs NOx contained in the exhaust gas into the NOx storage material. When fuel concentration in the exhaust gas becomes rich, the absorbed NOx is removed by the action of the noble metal.

Patent Literature 1: Unexamined Japanese Patent Publication No. 2002-361094

DISCLOSURE OF THE INVENTION

Problems to be Solved by the Invention

Since the fuel concentration in the exhaust gas of the aforementioned lean burn engine is low, a conventional catalyst has been unable to sufficiently purify NOx.

Also, due to a low melting point of alkali metal as the NOx storage material, the alkali metal migrates and is solid-solutioned into the catalyst substrate when the catalyst is heated to high temperatures. As a result, performance of the catalyst is lowered.

The present invention has been made in view of the above point. An object of the present invention is to provide an exhaust gas purifying catalyst that exhibits high NOx purification performance even in the exhaust gas of a lean burn engine such as, for example, a gasoline engine, diesel engine and others, and that does not allow deterioration of catalytic performance even in high temperatures.

Means to Solve the Problems

The present invention provides an exhaust gas purifying catalyst having:

a catalyst substrate; and a catalyst coating layer that is formed on the catalyst substrate and contain (a) Rh, (b) Pt, (c) an alkali metal or alkaline earth element, and (d) an inorganic oxide, the catalyst coating layer having a layered structure including an inside layer where the component (a) is substantially locally existing, and an outside layer where the component (b) is substantially locally existing, and the inside layer also containing a zirconia oxide.

The exhaust gas purifying catalyst of the present invention can inhibit the component (c): an alkali metal or alkaline earth element, from migrating and being solid-solutioned into the catalyst substrate even in high temperatures (for example, 350-450° C.) due to inclusion of the inside layer containing a zirconia oxide. Also, the exhaust gas purifying catalyst of the present invention can exhibit high NOx purification performance in exhaust gas of a lean burn engine.

In the present invention, the component (a): Rh, is substantially locally existing in the inside layer and the component (b): Pt, is substantially locally existing in the outside layer. Separation of the component (a): Rh, and the component (b): Pt, in this manner can suppress reduction in activity of noble metal and further enhance the NOx purification performance.

The phrase that "the component (a) is substantially locally existing" means that most (for example, 70 weight % or above, more preferably all) of Rh contained in the whole catalyst coating layer exists in the inside layer. Also, the phrase that "the component (b) is substantially locally existing" means that most (for example, 70 weight % or above, more preferably all) of Pt contained in the whole catalyst coating layer exists in the outside layer.

The component (c): an alkali metal or alkaline earth element, and the component (d): an inorganic oxide, may be contained at least in the outside layer. In this manner, the NOx purification performance is further improved.

The zirconia oxide contained in the inside layer may be an oxide of only zirconia. Other examples of the zirconia oxide are composite oxides of an element selected from a group consisting of alkaline earth elements (for example, Ca and Mg) and rare earth elements (for example, Y, Ce, La and so on), and zirconia. The latter composite oxides are preferable since they can inhibit the component (c): an alkali metal or alkaline earth element, from migrating and being solid-solutioned into the catalyst substrate under the conditions of higher temperatures. In the composite oxides, it is ideal that the additive amount of the element other than zirconia (for example, Ca) is 1.0-8 weight % in terms of oxide, preferably in a range of 1-4 weight %. A weight % of 1.0% or above can further improve the effect of inhibiting the component (c): an alkali metal or alkaline earth element, from migrating and being solid-solutioned into the catalyst substrate. A weight % of 8% or below (preferably, a weight % of 7% or below) can inhibit zirconia properties being lost and the inside layer from being difficult to prepare.

The composite oxide in the present specification means not only a simple mixture of a plurality of oxides, but an oxide solid-solutioned into the structure of other oxide by means of heat treatment. The method of forming the latter composite oxide is not limited to heat treatment. Other known methods can be utilized.

The position of the inside layer may be on the side nearer to the catalyst substrate than the outside layer. It is preferable that the inside layer is adjacent to the catalyst substrate.

The exhaust gas purifying catalyst of the present invention may include noble metal other than Rh and Pt (for example, Pd, Ir and so on) The noble metal other than the Rh and Pt may be contained in one or both of the inside layer and the outside layer. Specifically, Pd may be contained in one or both of the inside layer and the outside layer. Given that Pd controls sintering of Pt, however, it is preferable that Pd is added to the same layer containing Pt. The catalyst coating layer may include a layer other than the inside layer and the outside layer, for example, between the inside layer and the outside layer or on the outer side of the outside layer.

Examples of the alkali metal element in the component (c) are, for example, Li, Na, K, and so on. Examples of the alkaline earth element in the component (c) are, for example, Ba, Sr and so on. The component (c) may be present in both of the inside layer and the outside layer, or only in the outside layer.

Examples of the inorganic oxide in the component (d) are, for example, zirconia oxide, alumina, Ce oxide, silica, titania, CeZr composite oxide, and so on. It is preferable that the amount of zirconia oxide contained in the inside layer is in a range of 40-120 g/L. 40 g/L or above of zirconia oxide allows the inside layer to be formed on the surface of the catalyst substrate without producing uncoated portions, and further improves the effect of inhibiting the component (c): an alkali metal or alkaline earth element, from migrating and being solid-solutioned into the catalyst substrate. 120 g/L or below of zirconia oxide allows the outside layer to be easily formed. Alumina is preferable for the component (d): an inorganic oxide, in the outside layer.

There is no particular limitation to the types of the catalyst substrate as long as the catalyst substrate is the one generally used for an exhaust gas purifying catalyst. For example, a honeycomb substrate, a corrugated substrate, a monolith honeycomb substrate and others may be employed. The material of the catalyst substrate may be any refractory materials. For example, an integrally structured type of a substrate made of refractory ceramics, such as cordierite or the like, or of metal, such as ferrite stainless steel or the like, can be employed.

EXPLANATION OF REFERENCE NUMERALS

1, 101 . . . exhaust gas purifying catalyst
3 . . . substrate
5, 105 . . . inside layer
7, 107 . . . outside layer
9 . . . catalyst coating layer

BEST MODE FOR CARRYING OUT THE INVENTION

The present invention will be explained by way of embodiments.

Figure 1:
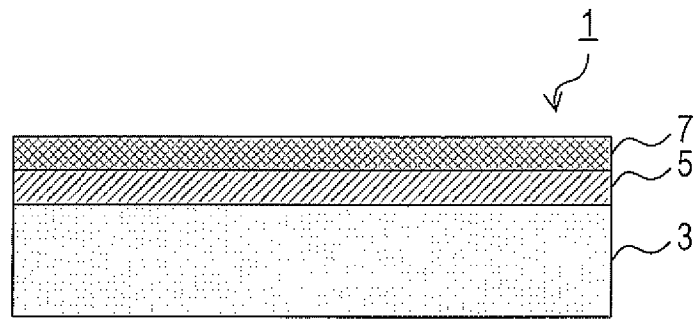
FIG. 1 is an explanatory view showing a structure of an exhaust gas purifying catalyst.

Embodiment 1 a) A description will now be given on a structure of an exhaust gas purifying catalyst 1 of an Embodiment 1 with reference to FIG. 1.

The exhaust gas purifying catalyst 1 includes an inside layer 5 formed on the surface of a substrate (catalyst substrate) 3, and an outside layer 7 further formed on top of the inside layer 5. The inside layer 5 and the outside layer 7 function as a catalyst coating layer. The substrate 3 is a monolith honeycomb substrate having a capacity of 1.0 L and a cell density of 400 cells/in$^2$. The inside layer 5 and the outside layer 7 are formed on the inner face of each cell of the substrate 3.

The inside layer 5 has the following composition.

Rh: 0.5 g/L
Zr-based composite oxide added with 2 weight % of Ca in terms of oxide: 50 g/L
Ba
Li
K The outside layer 7 has the following composition.

Pt: 2 g/L
alumina: 100 g/L
ZnTi composite oxide: 100 g/L
CeZr composite oxide: 20 g/L
Ba
Li
K Ba, Li and K are contained throughout the inside layer 5 and outside layer 7. The entire compound amounts of Ba, Li and K are 0.2 mol/L, 0.1 mol/L, and 0.15 mol/L, respectively. Ba, Li and K are components that react with nitrogen oxides.

b) A description will now be given on a method of manufacturing the exhaust gas purifying catalyst 1 of the Embodiment 1.

First, slurries S1 and S2 were prepared by mixing below listed components.

(Slurry S1)

Rh chloride solution: an amount containing 0.5 g of Rh
Zr-based composite oxide added with 2 weight % of Ca in terms of oxide: 50 g
water: 100 g (Slurry S2)

alumina: 100 g
ZrTi composite oxide: 100 g
CeZr composite oxide: 20 g
water: 200 g Subsequently, the slurry S1 was applied to coat the entire substrate 3, dried at 250° C. for two or more hours, and calcined at 500° C. for an hour or more to form the inside layer 5. Then, the slurry S2 was applied to coat the substrate 3 having the slurry S1 previously applied thereon, dried at 250° C. for two or more hours, and calcined at 500° C. for an hour or more to form the outside layer 7. Furthermore, the coated substrate 3 was dipped in a Pt nitrate solution (an amount containing 2 g of Pt) in order to make the outside layer 7 support 2 g/L of Pt.

Subsequently, the coated substrate 3 was dipped in an acetic acid solution containing 0.2 mol of Ba, 0.1 mol of K and 0.15 mol of Li. After excess fluid is blown off, the coated substrate 3 was dried for thirty or more minutes at 350° C. thereby to finish the exhaust gas purifying catalyst 1.

Embodiment 2

The exhaust gas purifying catalyst 1 of an Embodiment 2 has basically the same structure as that of the Embodiment 1, but partly differs in the inside layer 5. Explanation below will focus on the difference. The inside layer 5 in the present embodiment contains an oxide including only zirconia (hereinafter, referred to as "zirconia") instead of the Zr-based composite oxide added with 2 weight % of Ca in terms of oxide.

The method of manufacturing the exhaust gas purifying catalyst 1 of the Embodiment 2 is basically the same as that of the Embodiment 1. In the Embodiment 2, a slurry S3 was used in place of the slurry S1 to form the inside layer 5. The slurry S3 was prepared by mixing below listed components.

(Slurry S3)

Rh nitrate solution: an amount containing 0.5 g of Rh
zirconia: 50 g
water: 100 g Embodiment 3

The exhaust gas purifying catalyst 1 of an Embodiment 3 has basically the same structure as that of the Embodiment 1, but differs in that the outside layer 7 contains not only Pt but Pt (1.5 g/L) and Pd (0.5 g/L) as the noble metal.

The method of manufacturing the exhaust gas purifying catalyst 1 of the Embodiment 3 is basically the same as that of the Embodiment 1. In the Embodiment 3, the substrate 3 was dipped not in a Pt nitrate solution but in a PtPd nitrate solution (an amount containing 1.5 g of Pt and 0.5 g of Pd) after the outside layer 7 was formed so as to make the outside layer 7 support 1.5 g/L of Pt and 0.5 g/L of Pd. The step of making the substrate 3 support Ba, K and Li thereafter is the same as that of the Embodiment 1.

COMPARATIVE EXAMPLE 1

Figure 2:
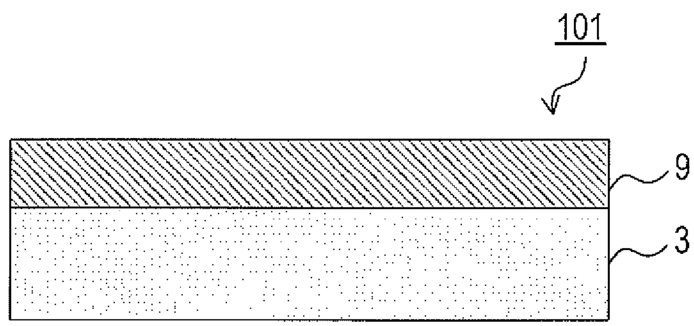
FIG. 2 is an explanatory view showing a structure of an exhaust gas purifying catalyst.

An exhaust gas purifying catalyst 101 of the Comparative Example 1 is structured such that a single catalyst coating layer 9 is formed on the surface of the substrate (catalyst substrate) 3, as shown in FIG. 2. The substrate 3 is the same as that of the Embodiment 1.

The catalyst coating layer 9 has the following composition.

alumina: 100 g/L
zirconia: 50 g/L
ZrTi composite oxide: 100 g/L
CeZr composite oxide: 20 g/L
Rh: 0.5 g/L
Pt: 2 g/L
Ba: 0.2 mol/L
Li: 0.1 mol/L
K: 0.15 mol/L To manufacture the exhaust gas purifying catalyst 101 of the Comparative Example 1, the following components were first mixed and wet-milled to prepare a slurry S4.

(Slurry S4)

alumina: 100 g
zirconia 50 g
ZrTi composite oxide: 100 g
CeZr composite oxide: 20 g
Rh: 0.5 g Subsequently, the slurry S4 was applied to coat the entire substrate 3, dried at 250° C. for two or more hours, and calcined at 500° C. for an hour or more to form the catalyst coating layer 9.

Subsequently, the substrate 3 was dipped in a Pt nitride solution to make the catalyst coating layer 9 impregnate and support 2 g/L of Pt, and dried thereafter.

Moreover, Ba, K and Li were made supported by the catalyst coating layer 9 in the same manner as in the Embodiment 1 thereby to finish the exhaust gas purifying catalyst 101.

COMPARATIVE EXAMPLE 2

Figure 3:
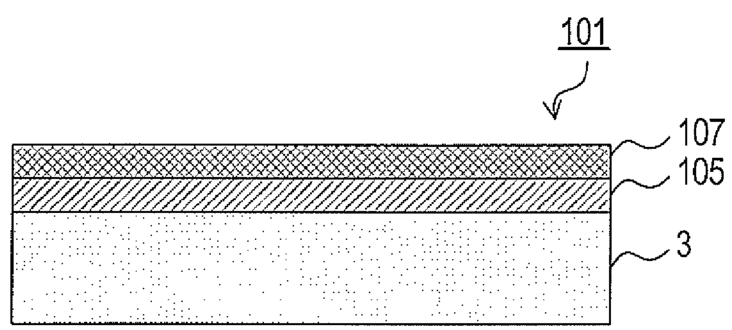
FIG. 3 is an explanatory view showing a structure of an exhaust gas purifying catalyst.

The exhaust gas purifying catalyst 101 of a Comparative Example 2 was structured such that an inside layer 105 and an outside layer 107 are formed on the substrate 3, as shown in FIG. 3. The composition of the inside layer 105 is the same as the composition of the outside layer 7 of the Embodiment 1. The composition of the outside layer 107 is the same as the composition of the inside layer 5 of the Embodiment 1. In other words, in the exhaust gas purifying catalyst 101 of a Comparative Example 2, the inside layer and the outside layer of the Embodiment 1 are replaced with each other.

The exhaust gas purifying catalyst 101 of the Comparative Example 2 was prepared as below. First; the slurry S2 was applied to coat the entire substrate 3, dried at 250° C. for two or more hours, and calcined at 500° C. for an hour or more to form the inside layer 105. Then, the coated substrate 3 was dipped in a Pt nitrate solution (an amount containing 2 g of Pt) in order to make the inside layer 105 support 2 g/L of Pt.

Furthermore, the slurry S1 was applied to coat the substrate 3 having the slurry S2 previously applied thereon, dried at 250° C. for two or more hours, and calcined at 500° C. for an hour or more to form the outside layer 107. Then, Ba, K and Li were made supported by the inside layer 105 and the outside layer 107 in the same manner as in the Embodiment 1 thereby to finish the exhaust gas purifying catalyst 101.

COMPARATIVE EXAMPLE 3

The exhaust gas purifying catalyst 101 of the Comparative Example 3 has basically the same structure as that of the Embodiment 2, but partially differs in the inside layer 5 and the outside layer 7. Explanation below will focus on the difference. Rh is not contained in the inside layer 5 but in the outside layer 7. That is, in the Comparative Example 3, both Rh and Pt are contained in the outside layer 7.

The method of manufacturing the exhaust gas purifying catalyst 101 of the Comparative Example 3 is basically the same as that of the Embodiment 1. In the Comparative Example 3, a slurry S5 was used in place of the slurry S1 to form the inside layer 5, and a slurry S6 was used in place of the slurry S2 to form the outside layer 7. The slurries S5 and S7 were prepared as below.

(Slurry S5)

The below components were mixed.

zirconia: 50 g
water: 100 g (Slurry S6)

The slurry S6 was prepared as below.

First, Rh was made selectively supported by a Zr composite oxide containing Ca (2 wt %). Subsequently, the Zr composite oxide containing Ca (2 wt %), alumina, and a CeZr composite oxide were mixed to prepare the slurry S6.

COMPARATIVE EXAMPLE 4

The exhaust gas purifying catalyst 101 of the Comparative Example 4 has basically the same structure as that of the Embodiment 1, but partially differs in the inside layer 5. Explanation below will focus on the difference.

The inside layer 5 has the following composition.

Rh: 0.5 g/L
alumina: 50 g/L
Ba
Li
K

That is, in the Comparative Example 4, the inside layer 5 does not contain a zirconia oxide, but alumina instead.

The method of manufacturing the exhaust gas purifying catalyst 101 of the Comparative Example 4 is basically the same as that of the Embodiment 1. In the Comparative Example 4, a slurry S7 was used in place of the slurry S1 to form the inside layer 5. The slurry S7 was prepared by mixing below listed components (Slurry S7)

Rh chloride solution: an amount containing 0.5 g of Rh
alumina: 50 g
water: 100 g

COMPARATIVE EXAMPLE 5

The exhaust gas purifying catalyst 101 of the Comparative Example 5 has basically the same structure as that of the Comparative Example 4, but partially differs in the outside layer 7. Explanation below will focus on the difference.

The outside layer 7 has the following composition.

Pt: 2 g/L alumina: 220 g/L

Ba

Li

K

In other words, in the Comparative Example 5, the outside layer 7 does not contain a ZrTi composite oxide and a CeZr composite oxide.

The method of manufacturing the exhaust gas purifying catalyst 101 of the Comparative Example 5 is basically the same as that of the Comparative Example 4. However, in the Comparative Example 5, a slurry S8 was used in place of the slurry S2 to form the outside layer 7. The slurry S8 was prepared by mixing below listed components.

(Slurry S8)

alumina: 220 g water: 500 g

COMPARATIVE EXAMPLE 6

The exhaust gas purifying catalyst 101 of the Comparative Example 6 has basically the same structure as that of the Embodiment 1, but differs in that Pt is disposed in the inside layer 5 and Rh is disposed in the outside layer 7. Explanation below will focus on the difference.

The inside layer 5 has the following composition,

Pt: 2 g/L

Zr-based composite oxide added with 2 weight % of Ca in terms of oxide: 50 g/L

Ba

Li

K

The outside layer 7 has the following composition.

Rh. 0.5 g/L alumina: 100 g/L

ZrTi composite oxide: 100 g/L

CeZr composite oxide: 20 g/L

Ba

Li

The method of manufacturing the exhaust gas purifying catalyst 101 of the Comparative Example 6 is basically the same as that of the Embodiment 1. In the Comparative Example 6, a slurry S9 was used in place of the slurry S1 to form the inside layer 5. The slurry S9 was prepared by mixing below listed components (Slurry S9)

Pt nitrate solution: an amount containing 2 g of Pt

Zr-based composite oxide added with 2 weight % of Ca in terms of oxide: 50 g water: 100 g After the outside layer 7 was formed using the slurry S2, Rh was made supported by the outside layer 7 using a Rh chloride solution.

Now, explanation is given on tests for verifying performance of the exhaust gas purifying catalysts 1 manufactured in the respective Embodiments.

(1) Evaluation of Alkali Metal Residual Volume in the Catalyst Coating Layer (1-1) Test Method First, each of the exhaust gas purifying catalysts was applied to a gasoline engine of 2000 cc displacement. Then, a deterioration acceleration durability test (hereinafter, referred to as "durability test") was conducted in which a stoichiometric condition at 750° C. and a lean condition of 700° C. are repeatedly alternated 40 times.

Thereafter, only the catalyst coating layer was scraped from the exhaust gas purifying catalyst and dissolved in an acid. Then, an alkali metal (K) volume was measured by chemical analysis (ICP). The measurement was conducted to the exhaust gas purifying catalysts of the Embodiments 1-3 and the Comparative Examples 1-6.

Table 1 shows the alkali metal (K) volume remained in the catalyst coating layer. The initial volume of alkali metal (K) compounded in the catalyst coating layer is the same in any of the Embodiments 1-3 and the Comparative Examples 1-6.

TABLE 1

| | Residual volume of K (mol/L) |
|---|---|
| Embodiment 1 | 0.12 |
| Embodiment 2 | 0.115 |
| Embodiment 3 | 0.112 |
| Comp. Ex. 1 | 0.092 |
| Comp. Ex. 2 | 0.105 |
| Comp. Ex. 3 | 0.099 |
| Comp. Ex. 4 | 0.104 |
| Comp. Ex. 5 | 0.093 |
| Comp. Ex. 6 | 0.098 |

As shown in Table 1, in the exhaust gas purifying catalysts according to the Embodiments 1-3, the residual volume of alkali metal (K) in the catalyst coating layer is large as compared to the exhaust gas purifying catalysts according to the Comparative Examples 1, 2, 4 and 5. This is considered because, in the exhaust gas purifying catalysts according to the Embodiments 1-3, zirconia contained in the inside layer 5 inhibits the component (c): an alkali metal or alkaline earth element, from migrating and being solid-solutioned into the substrate 3.

Specifically, in the exhaust gas purifying catalysts according to the Embodiments 1 and 3, the residual volume of alkali metal (K) in the catalyst coating layer was all the more large. This is considered because the Zr-based composite oxide added with Ca contained in the inside layer 5 was all the more excellent in inhibiting the component (c): an alkali metal or alkaline earth element, from migrating and being solid-solutioned into the substrate 3.

(2) Evaluation of Catalytic Activity (2-1) Test Method

The durability test was conducted to each of the exhaust gas purifying catalysts in the same manner as in "(1-1) Test method". Then, a model gas containing HC, $O_2$ and NO was let flow through the exhaust gas purifying catalyst. While the catalyst temperature was made raised at a speed of 30° C./min from 100° C., the HC purification rate in a lean atmosphere was measured. The HC purification rate is a value expressed by (A-B)/A where A is a HC concentration on an entrance side of the catalyst and B is a HC concentration on an exit side of the catalyst. The experiments were conducted with respect to the Embodiments 1-3 and the Comparative Examples 1 and 3 (in which both Pt and Rh are present in one and the same layer).

The HC purification rate was improved as the catalyst temperature is raised. For each exhaust gas purifying catalyst, a temperature is obtained at which the HC purification rate reaches 20%, 40%, 50%, 70% and 90%. The results were shown in Table 2.

TABLE 2

| | Temperature at which HC purification rate reaches a predetermined value (° C.) | | | | |
|---|---|---|---|---|---|
| | 20% | 40% | 50% | 70% | 90% |
| Embodiment 1 | 195 | 210 | 215 | 230 | 265 |
| Embodiment 2 | 205 | 210 | 216 | 235 | 270 |
| Embodiment 3 | 196 | 207 | 212 | 231 | 260 |
| Comp. Ex. 1 | 205 | 215 | 225 | 245 | 286 |
| Comp. Ex. 3 | 205 | 217 | 224 | 243 | 282 |

As shown in Table 2, in the exhaust gas purifying catalysts according to the Embodiments 1-3, the temperatures at which the HC purification rate has reached a predetermined value were low as compared to the exhaust gas purifying catalysts according to the Comparative Examples 1 and 3. In other words, the catalytic activities of the exhaust gas purifying catalysts of the Embodiments 1-3 were higher than those the exhaust gas purifying catalysts of the Comparative Examples 1 and 3. This is considered because the catalytic activities of the exhaust gas purifying catalysts of the Embodiments 1-3 are enhanced by containing Rh in the inside layer 5 and Pt in the outside layer 7.

(3) Evaluation of NOx Reduction Amount (3-1) Test Method

First, each of the exhaust gas purifying catalysts was applied to a gasoline lean burn engine of 2000 cc displacement to produce a lean atmosphere of A/F=20-28. Then, a NOx reduction amount (mg) was calculated from a difference between a NOx concentration on the entrance side of the catalyst and a NOx concentration on the exit side of the catalyst at the time. Other conditions at the measurement were as below.

The NOx concentration on the exit side of the catalyst was measured until NOx concentration on the exit side of the catalyst reaches 80% or above of the NOx concentration on the entrance side of the catalyst.

engine revolution: 1200-3000 rpm torque: 20-70 N·m entrance gas temperature: 300° C., 350° C., 400° C., 450° C., 500° C.

The experiments were conducted to the exhaust gas purifying catalysts of the Embodiments 1-3 and the Comparative Examples 1-6. The results were shown in Table 3.

TABLE 3

| | No*x* reduction amount (mg) at respective temperature | | | | |
|---|---|---|---|---|---|
| | 300° C. | 350° C. | 400° C. | 450° C. | 500° C. |
| Embodiment 1 | 75.0 | 178.6 | 596.5 | 928.6 | 456.8 |
| Embodiment 2 | 64.3 | 135.7 | 392.9 | 600.0 | 392.9 |
| Embodiment 3 | 76.4 | 175.0 | 589.3 | 857.1 | 450.0 |
| Comp. Ex. 1 | 70.3 | 143.9 | 410.7 | 500.0 | 385.7 |
| Comp. Ex. 2 | 2.6 | 72.9 | 297.6 | 383.0 | 161.6 |
| Comp. Ex. 3 | 69.5 | 126.9 | 278.1 | 430.6 | 188.2 |
| Comp. Ex. 4 | 71.4 | 175.0 | 385.7 | 521.4 | 385.7 |
| Comp. Ex. 5 | 23.4 | 100.3 | 265.3 | 354 | 114 |
| Comp. Ex. 6 | 13.8 | 87.9 | 302.3 | 405.2 | 210.5 |

As shown in Table 3, the NOx purification performance of the exhaust gas purifying catalysts of the Embodiments 1-3 was high and, specifically higher than that of any of the exhaust gas purifying catalysts of the Comparative Examples 1-6 when the entrance gas temperatures were 450-500° C. Also, the NOx purification performance of the exhaust gas purifying catalysts according to the Embodiments 1 and 3 was remarkably higher than that of the exhaust gas purifying catalysts of the Comparative Examples 1-6 at all the temperatures. From these results, it is clear that the NOx purification performance of the exhaust gas purifying catalysts of the Embodiments 1-3 is also high in the case of the exhaust gas from a lean burn engine.

It is to be understood that the present invention should not be limited to the above described embodiments, but may be practiced in various forms within the scope not departing from the present invention.

For instance, in the Embodiment 3, 0.5 g of Pd may not be contained in the outside layer 7 but in the inside layer 5. Also, Pd may be contained in both the outside layer 7 and the inside layer 5.

The invention claimed is:

1. An exhaust gas purifying catalyst comprising:

a catalyst substrate; and a catalyst coating disposed on or over the catalyst substrate, and including the following components (a), (b), (c), and (d): (a) Rh, (b) Pt, (c) an alkali metal or alkaline earth element, and (d) an inorganic oxide, wherein the catalyst coating layer has a layered structure including an inside layer, and an outside layer, wherein the inside layer further includes an oxide comprising zirconium, wherein substantially all of component (a) in the catalyst coating is present in the inside layer separate from component (b), wherein substantially all of component (b) in the catalyst coating is present in the outside layer separate from component (a), wherein a noble metal selected from a group consisting of Pd and Ir is included in the outside layer, and wherein the inside layer is devoid of Pd.

2. The exhaust gas purifying catalyst according to claim 1, wherein at least the outside layer comprises component (c) and component (d).

3. The exhaust gas purifying catalyst according to claim 1, wherein the oxide comprising zirconium is a composite oxide further comprising an element selected from a group consisting of alkaline earth elements and rare earth elements.

4. The exhaust gas purifying catalyst according to claim 1, wherein the outside layer comprises Pd.

5. The exhaust gas purifying catalyst according to claim 1, wherein the inside layer is adjacent to the catalyst substrate.

6. The exhaust gas purifying catalyst according to claim 1, further comprising an intervening layer disposed between the inside layer and the outside layer.

7. The exhaust gas purifying catalyst according to claim 1, further comprising an additional layer, wherein the outside layer is disposed between the inside layer and the additional layer.

8. The exhaust gas purifying catalyst according to claim 1, operatively coupled to an internal combustion engine to receive exhaust gas produced by the internal combustion engine.

9. The exhaust gas purifying catalyst according to claim 1, wherein:

the inside layer is effective to inhibit migration of the at least one of an alkali metal and an alkaline earth element from the outside layer to the catalyst substrate when the exhaust gas purifying catalyst is exposed to exhaust gas of a lean burn internal combustion engine.

10. The exhaust gas purifying catalyst of claim 9, wherein the inside layer is effective to inhibit migration of the at least one of an alkali metal and an alkaline earth element from the outside layer to the catalyst substrate when exposed to said exhaust gas at an operating temperature of from about 350° C. to about 450° C.

11. The exhaust gas purifying catalyst according to claim 1, wherein the inside layer and the outside layer contain 0.2 mol/L of Ba, 0.1 mol/L of Li, and 0.15 mol/L of K.

12. An exhaust gas purifying catalyst comprising:

a catalyst substrate; and a catalyst coating disposed on or over the catalyst substrate, and including the following components (a), (b), (c), and (d): (a) Rh, (b) Pt, (c) an alkali metal or alkaline earth element, and (d) an inorganic oxide, wherein the catalyst coating layer has a layered structure including an inside layer within which component (a) is substantially locally existing, and an outside layer within which component (b) is substantially locally existing, and wherein the inside layer further includes an oxide comprising zirconium, and wherein the inside layer and the outside layer contain 0.2 mol/L of Ba, 0.1 mol/L of Li, and 0.15 mol/L of K.

13. The exhaust gas purifying catalyst according to claim 12, wherein at least about 70 weight percent of component (a) in the catalyst coating is present in the inside layer.

14. The exhaust gas purifying catalyst according to claim 12, wherein substantially all of component (a) in the catalyst coating is present in the inside layer.

15. The exhaust gas purifying catalyst according to claim 12, wherein at least about 70 weight percent of component (b) in the catalyst coating is present in the outside layer.

16. The exhaust gas purifying catalyst according to claim 12, wherein substantially all of component (b) in the catalyst coating is present in the outside layer.

17. The exhaust gas purifying catalyst according to claim 12, wherein the inside layer is devoid of Pd.

18. The exhaust gas purifying catalyst according to claim 12, operatively coupled to an internal combustion engine to receive exhaust gas produced by the internal combustion engine.

19. A method of purifying exhaust gas from an internal combustion engine, the method comprising flowing said exhaust gas through a catalyst device comprising the exhaust gas purifying catalyst of claim 12.

20. An exhaust gas purifying catalyst comprising:

a catalyst substrate; and a catalyst coating disposed on or over the catalyst substrate, and including the following components (a), (b), (c), and (d): (a) Rh, (b) Pt, (c) an alkali metal or alkaline earth element, and (d) an inorganic oxide, wherein the catalyst coating layer has a layered structure including an inside layer, and an outside layer, wherein the inside layer further includes an oxide comprising zirconium, wherein substantially all of component (a) in the catalyst coating is present in the inside layer separate from component (b), wherein substantially all of component (b) in the catalyst coating is present in the outside layer separate from component (a), and wherein Ir is present in at least one of the inside layer and the outside layer.

21. An exhaust gas purifying catalyst comprising:

a catalyst substrate; and a catalyst coating disposed on or over the catalyst substrate, and including the following components (a),(b),(c), and (d):(a) Rh,(b) Pt,(c) an alkali metal or alkaline earth element, and (d) an inorganic oxide, wherein the catalyst coating layer has a layered structure including an inside layer, and an outside layer, wherein the inside layer further includes an oxide comprising zirconium, wherein substantially all of component (a) in the catalyst coating is present in the inside layer separate from component (b), wherein substantially all of component (b) in the catalyst coating is present in the outside layer separate from component (a), and wherein the inside layer is devoid of Pd.

* * * * *